United States Patent [19]

Hayashi et al.

[11] Patent Number: 5,270,817
[45] Date of Patent: Dec. 14, 1993

[54] TELEVISION SIGNAL PROCESSING APPARATUS FOR SEPARATING AN AUXILIARY SIGNAL FROM A LETTERBOX SIGNAL

[75] Inventors: Kenichiro Hayashi, Toyonaka, Japan; Shuji Inoue, Burlington, N.J.; Sadashi Kageyama; Hideyo Uwabata, both of Hirakata, Japan; Todd S. Bowser, Itami, Japan; Yoshio Yasumoto, Nara, Japan

[73] Assignee: Matsushita Electric Industrial Co., Ltd., Osaka, Japan

[21] Appl. No.: 45,866

[22] Filed: Apr. 15, 1993

[30] Foreign Application Priority Data

Apr. 21, 1992 [JP] Japan ................... 4-100827

[51] Int. Cl.⁵ ............... H04N 7/00; H04N 11/00; H04N 7/08; H04N 5/16
[52] U.S. Cl. ................... 358/142; 358/141; 358/140; 358/168
[58] Field of Search ............ 358/141, 140, 142, 12, 358/11, 168, 171, 172, 438

[56] References Cited

U.S. PATENT DOCUMENTS

| | | | |
|---|---|---|---|
| 4,143,398 | 3/1979 | Harwood et al. | 358/168 X |
| 4,660,084 | 4/1987 | Filliman et al. | 358/168 X |
| 4,984,078 | 1/1991 | Skinner et al. | 358/141 |
| 5,075,773 | 12/1991 | Pullen et al. | 358/141 |
| 5,208,668 | 5/1993 | Dirsel et al. | 358/140 |
| 5,208,670 | 5/1993 | Sugimori et al. | |

FOREIGN PATENT DOCUMENTS

0510973A1 10/1992 European Pat. Off.
WO90/14732 11/1991 PCT Int'l Appl.

Primary Examiner—James J. Groody
Assistant Examiner—Safet Metjahic
Attorney, Agent, or Firm—Wenderoth, Lind & Ponack

[57] ABSTRACT

In the television broadcasting system called letter box method, it is proposed to transmit an image having a larger aspect ratio than that of the existing broadcasting system by using some of the scanning lines of the existing broadcasting system, and transmit some additional information signal in the remaining portion. An offset value applied to the additional information signal at the transmission side must be removed completely at the reception side. Accordingly, at the reception side, in the scanning line in which an offset reference signal indicative of the offset value is transmitted, the offset reference value and a DC level reference value of the scanning line are detected, and these values are retained until a next offset reference signal is detected. By detecting a DC level of a scanning line containing the additional information signal, a difference from the DC level reference value previously detected and retained is obtained, and the offset reference value detected and retained previously is corrected by this difference. Thus obtained offset value is subtracted from the transmitted additional information signal.

9 Claims, 4 Drawing Sheets

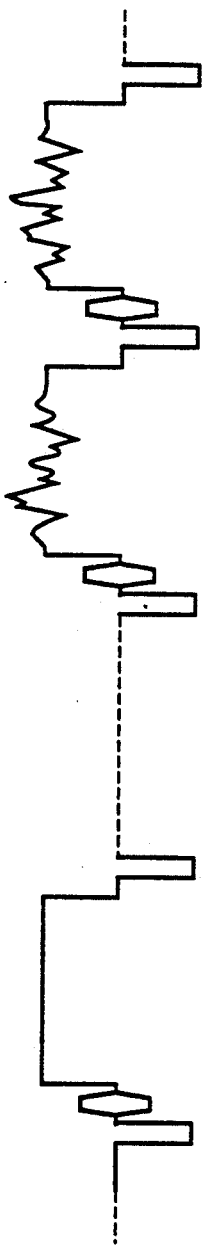
FIG. 5(a)
FIG. 5(b)
FIG. 5(c)
FIG. 5(d)
FIG. 5(e)

TELEVISION SIGNAL PROCESSING APPARATUS FOR SEPARATING AN AUXILIARY SIGNAL FROM A LETTERBOX SIGNAL

BACKGROUND OF THE INVENTION

1. Field of the Invention

The present invention relates to a television signal processing apparatus conforming to a wide television signal transmission system possessing a larger aspect ratio than 4:3 and capable of transmitting pictures of high quality, while maintaining compatibility with the existing television broadcasting system with the aspect ratio of 4:3 such as NTSC system and PAL system.

2. Description of the Related Prior Art

Among the wide television signal transmission systems keeping compatibility with the existing television broadcasting system, a system using the so-called letter box method is known. This method is to transmit a video signal in aspect ratio of 16:9 by using, for example in the case of the NTSC system, about 180 lines of the effective scanning lines (about 240 lines per field). By using the remaining scanning lines (about 60 lines per field), it is proposed to transmit some additional information signal. As such additional information, for example, horizontal high frequency component, vertical high frequency component, and vertical-temporal high frequency component of image are considered. Since these signals have both positive and negative polarities, a certain offset value is added at the transmission side so as to settle within the signal level transmittable by the existing television broadcasting system (disclosed in, for example, WO 90/14732).

When processing thus transmitted additional information signal at the reception side, it is necessary to remove the offset value added to the additional information signal to reproduce the original additional information signal. It is hence considered to transmit an offset reference value as shown in, e.g., ITEJ Technical Report Vol. 14, No. 20, pp. 19–24, BCS '90-22, March, 1990, and ITEJ Technical Report Vol. 14, No. 28, pp. 19–24, CE '90-22, BCS '90-28, May, 1990. At the reception side, after detecting this offset reference value, the value is retained until a next offset reference value is received, and is subtracted from the transmitted signal to reproduce the original additional information signal.

Generally, in a television receiver, the DC level of signal is fixed by the clamper, but the DC level of the output signal varies depending on the performance of the clamper. From such signal with varying DC level, when the offset reference value kept at a constant value is subtracted, an unnecessary offset is left in the additional information signal.

SUMMARY OF THE INVENTION

It is hence a primary object of the invention to present a television signal processing apparatus capable of reproducing an additional information signal added with an offset at a transmission side and transmitted on a specific scanning line of a television signal, even if the DC level of the scanning line containing the additional information signal fluctuates, by removing the offset using an offset reference value transmitted on another specific scanning line at specified intervals.

To achieve the object, the invention presents a television signal processing apparatus comprising: a level detector for detecting from an input television signal an offset reference value contained in a specific scanning line, a DC level of the same scanning line and a DC level of a scanning line containing an additional information signal; a first hold circuit for holding the offset reference value detected by the level detector until a next offset reference value is detected; a second hold circuit for holding the DC level of the scanning line containing the offset reference value detected by the level detector as a DC level reference value until a next DC level reference value is detected; a third hold circuit for holding the DC level of the scanning line containing the additional information signal detected by the level detector for one horizontal scanning period; and an arithmetic unit for subtracting the offset reference value held by the first hold circuit from the input television signal, adding the DC level reference value held by the second hold circuit, and subtracting the DC level value held by the third hold circuit.

The invention, being thus constituted, is capable of removing the offset value applied at the transmission side and reproducing the original additional information signal, regardless of the fluctuations of the DC level of each scanning line containing the additional information signal.

BRIEF DESCRIPTION OF THE DRAWINGS

FIG. 5(a) is an example of waveform diagram of a television signal relating to the invention.

FIG. 5(b) is an example of waveform diagram of accumulating-time control signal in a structural example of a level detector in an embodiment of the invention.

FIG. 5(c) is an example of waveform diagram of holding-time control signal in a structural example of an offset reference value hold circuit in an embodiment of the invention.

FIG. 5(d) is an example of waveform diagram of holding-time control signal in a structural example of a DC level reference value hold circuit in an embodiment of the invention.

FIG. 5 is an example of waveform diagram of holding-time control signal in a structural example of a DC level holding circuit in an embodiment of the invention.

DESCRIPTION OF THE PREFERRED EMBODIMENTS

To begin with, an input television signal relating to the invention will be described with reference to FIGS. 4(a)–(c).

Figure 4A:
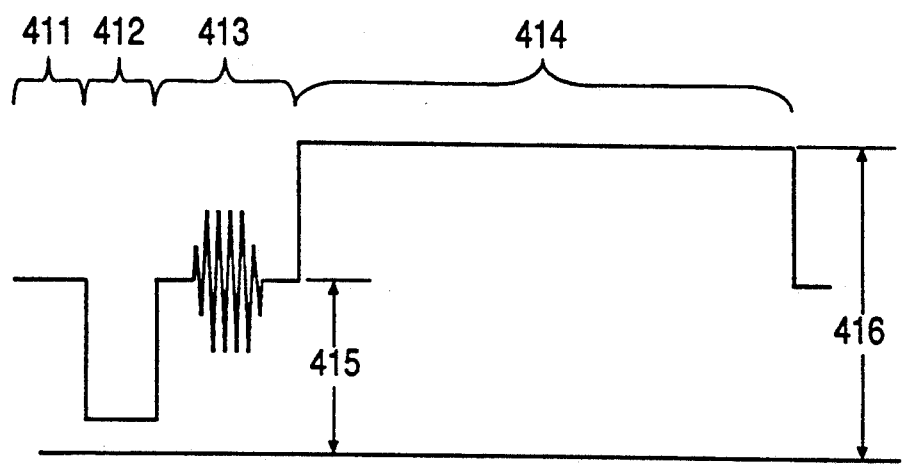
FIG. 4(a) is an example of waveform diagram of a scanning line for transmitting an offset reference value.

FIG. 4(a) is a waveform diagram showing an example of a scanning line signal transmitted at specific intervals, containing an offset reference signal 414 having an offset reference value 416. As the example, hereinafter, the level of back porch part 413 of this scanning line is used as a DC level reference value 415, but the effect is the same if the level of front porch part 411 or sync tip part 412 is used. FIG. 4(b) is a waveform diagram showing an example of a scanning line signal containing an additional information signal 424 provided with an offset value. The DC level 425 of this scanning line is the sum of the DC level reference value 415 and DC level fluctuation 427. Therefore, the offset value 426 is also the sum of the offset reference value 416 and DC level fluctuation 427. Herein, as the DC level of the scanning line containing the additional information signal, the level of the back porch part 423 is used. But when the level of the front porch part 411 or sync tip part 412 is used as the DC level reference value as mentioned above, as the DC level of the scanning line containing the additional information signal, too, the level of the front porch part 421 or sync tip part 422 may be used. FIG. 4(c) is a waveform diagram showing an example of the original additional information signal 431 after offset removal.

An embodiment of the invention will be described below by referring to the accompanying drawings.

Figure 1:
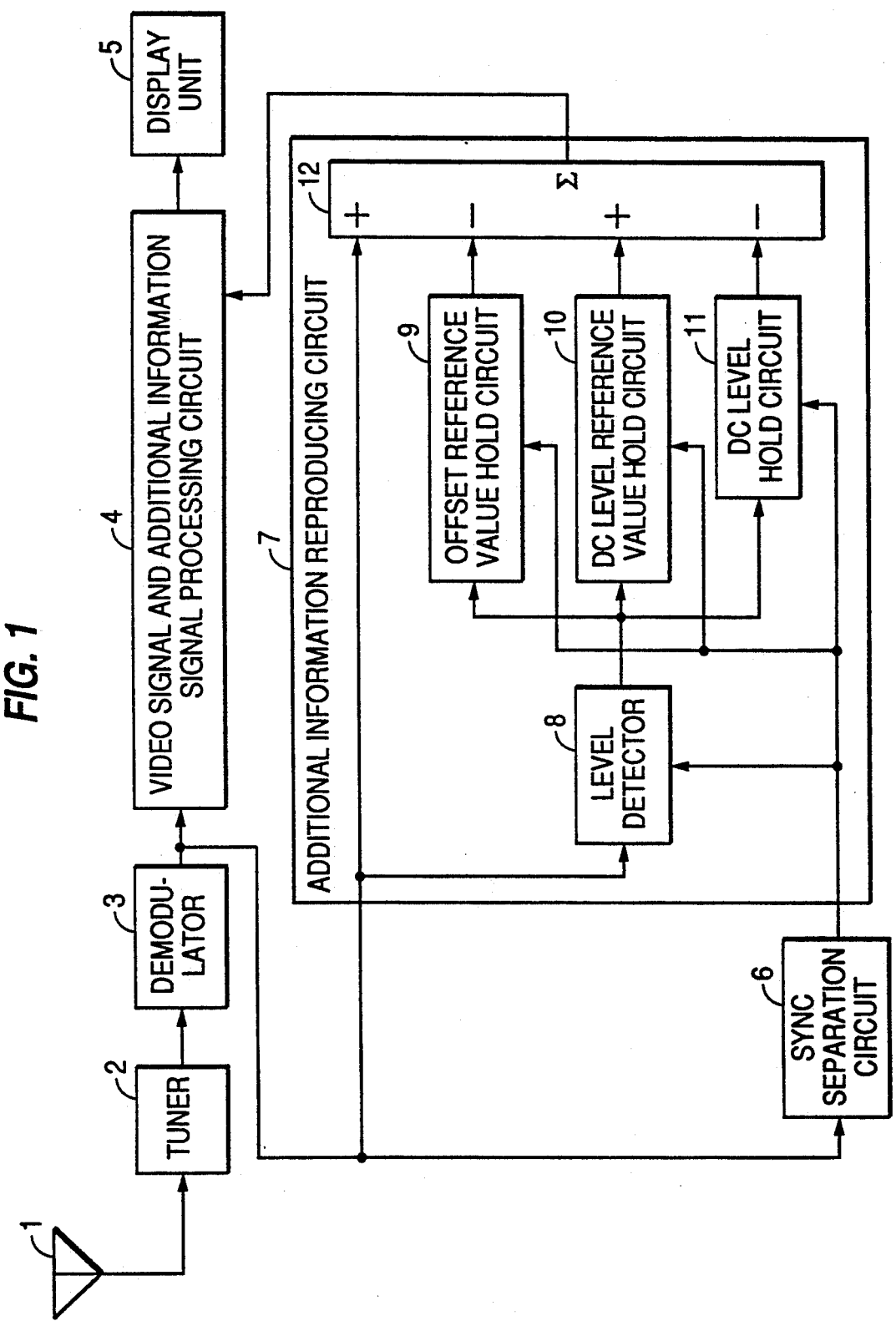
FIG. 1 is a block diagram showing an embodiment of the invention.

First is explained the constitution of an embodiment of a television receiver according to the invention shown in FIG. 1. The output of an antenna 1 is connected to the input of a tuner 2. An output of the tuner 2 is connected to an input of a demodulator 3. An output of the demodulator 3 is connected to a first input of a video signal and additional information signal processing circuit 4, an input of a sync separation circuit 6, and a first input of an additional information signal reproducing circuit 7. An output of the sync separation circuit 6 is connected to a second input of the additional information signal reproducing circuit 7. An output of the additional information signal reproducing circuit 7 is connected to a second input of the video signal and additional information signal processing circuit 4. An output of the video signal and additional information signal processing circuit 4 is connected to an input of a display unit 5.

An operation of the embodiment of the television receiver according to the invention shown in FIG. 1 will be explained below.

The tuner 2 in FIG. 1 selects a signal of a desired channel out of the television signals received by the antenna 1. The demodulator 3 demodulates the selected television signal to convert it into a base band video signal. The sync separation circuit 6 separates the vertical and horizontal sync signals from the base band video signal, and generates a clock. The additional information signal reproducing circuit 7 receives the base band video signal, which contains an additional information signal added with an offset in a specific scanning line and an offset reference value in another specific scanning line, and removes the offset to reproduce an original additional information signal by using the offset reference value, a DC level of the scanning line containing the offset reference value, and a DC level of the scanning line containing the additional information signal. The video signal and additional information signal processing circuit 4 processes the base band video signal and the reproduced original additional information signal in a specific manner which may be predetermined according to the additional information. For example, when the additional information signal is a reinforcement signal for improving the picture quality, it is synthesized with the base band video signal, and the synthesized signal may be processed in a specific manner. The display unit 5 displays the signal delivered from the video signal and additional information signal processing circuit 4.

Concerning next the additional information signal reproducing circuit 7 in FIG. 1, its internal structure and operation are described below.

In FIG. 1, a first input of the additional information signal reproducing circuit 7 is connected to a first input of a level detector 8 and a first input (+) of an adder 12. An output of the level detector 8 is connected to a first input of an offset reference value hold circuit 9, a first input of a DC level reference value hold circuit 10, and a first input of a DC level hold circuit 11. A second input of the additional information signal reproducing circuit 7 is connected to a second input of the level detector 8, a second input of the offset reference value hold circuit 9, a second input of the DC level reference value hold circuit 10, and a second input of the DC level hold circuit 11. An output of the offset reference value hold circuit 9 is connected to a second input (−) of the adder 12. An output of the DC level reference value hold circuit 10 is connected to a third input (+) of the adder 12. An output of the DC level hold circuit 11 is connected to a fourth input (−) of the adder 12. An output of the adder 12 is connected to an output of the additional information signal reproducing circuit 7.

The level detector 8 in FIG. 1 detects from the base band video signal an offset reference value 416, a DC level 415 of the scanning line containing an offset reference signal 414 as a DC level reference value as shown in FIG. 4 (a), and a DC level 425 of the scanning line containing an additional information signal 424 provided with an offset as shown in FIG. 4 (b). At this time, by calculating the time averages of levels in the respective periods of the DC level reference value 415, offset reference value 416, and DC level 425, errors of level detection can be decreased, but such averaging processing may be omitted in a simple constitution.

Figure 2:
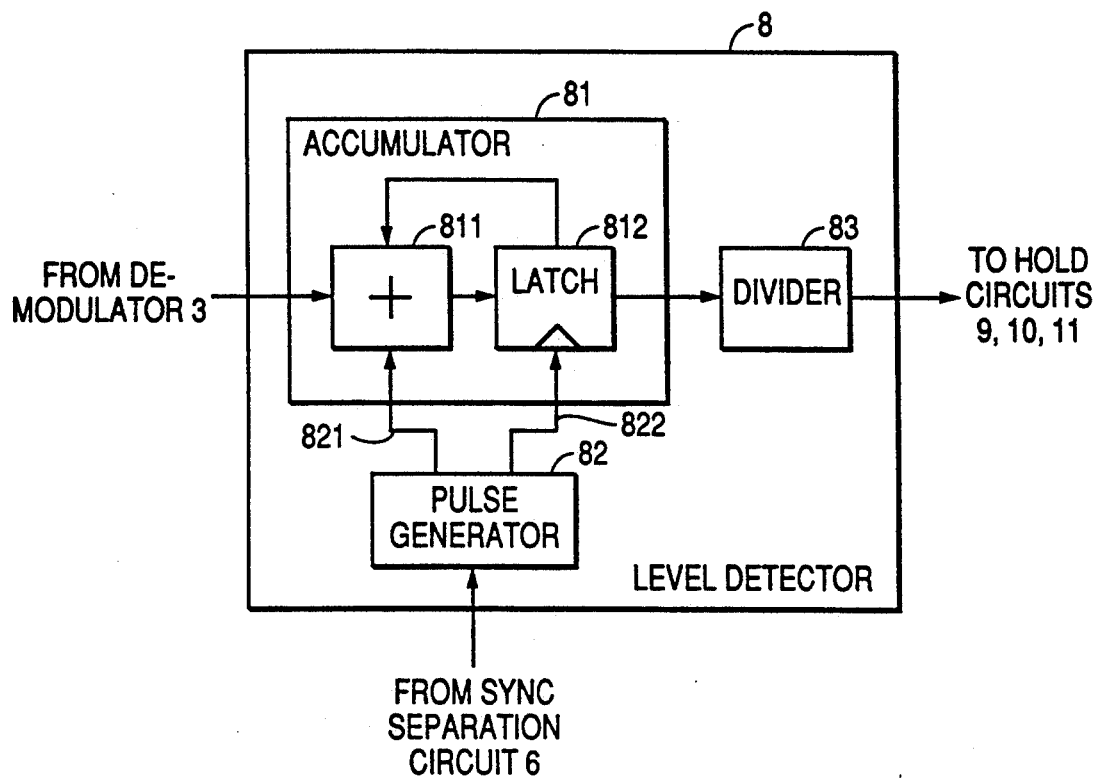
FIG. 2 is a block diagram showing a structural example of a level detector in an embodiment of the invention.

The level detector 8 in FIG. 1 may be realized, for example, in a constitution as shown in FIG. 2. An accumulator 81 in FIG. 2 comprises an adder 811 and a latch 812, and accumulates the input base band video signal in a specific period. A pulse generator 82 generates an accumulating-time control signal 821 and a clock 822 from the output clock of the sync separation circuit 6 in FIG. 1, and controls the accumulator 81. The accumulator 81 accumulates samples of the input signal only when the accumulating-time control signal 821 is "1". To accumulate the input signal, when the input signal is as shown in FIG. 5 (a), the accumulating-time control signal 821 may be, for example, as shown in FIG. 5 (b). A divider 83, in order to obtain a time average, divides the output of the accumulator 81 by a number corresponding to the accumulating time, or the number of accumulated samples. If the accumulating time is selected at $2^n$ times the clock period (where n is an integer), this division may be realized by a bit shift, and hence the divider 83 may be omitted.

The offset reference value hold circuit 9 in FIG. 1 holds the offset reference value 416 detected by the level detector 8 until a next offset reference value is detected. Similarly, the DC level reference value hold circuit 10 in FIG. 1 holds the DC level reference value 415 detected by the level detector 8 until a next DC level reference value is detected. In FIG. 1, moreover, the DC level hold circuit 11 holds the DC level 425 detected by the level detector 8 for one horizontal scanning period.

Figure 3:
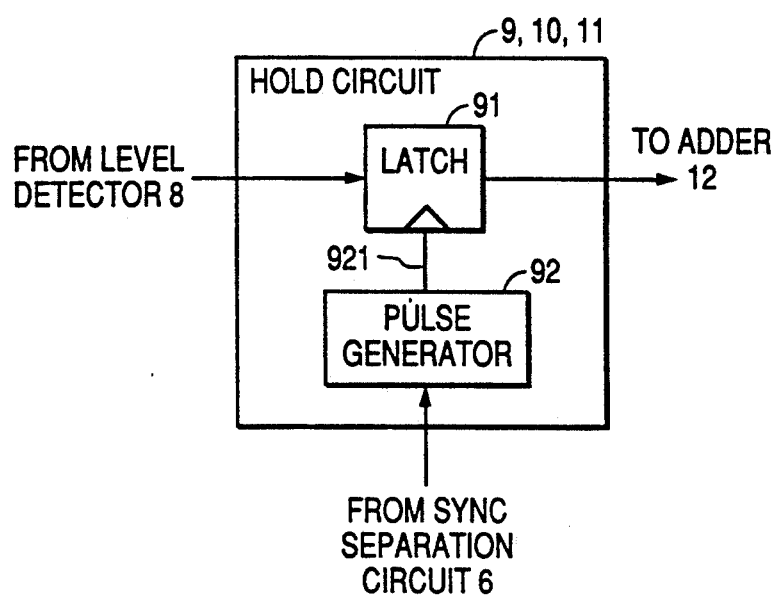
FIG. 3 is a block diagram showing a structural example of each of an offset reference value hold circuit, a DC level reference value hold circuit and a DC level hold circuit in an embodiment of the invention.

Each of the offset reference value hold circuit 9, DC level reference value hold circuit 10, and DC level hold circuit 11 in FIG. 1 is realized, for example, in a constitution as shown in FIG. 3. In FIG. 3, a latch 91, latches the output signal from the level detector 8 in response to a latch pulse 921 generated by a pulse generator 92. When using a latch of positive edge trigger, for the input signal as shown in FIG. 5(a), the latch pulses 921 for the offset reference value hold circuit 9, DC level reference value hold circuit 10, and DC level hold circuit 11 in FIG. 1 are as shown in FIGS. 5(c), 5(d), and 5(e), respectively.

Figure 4B:
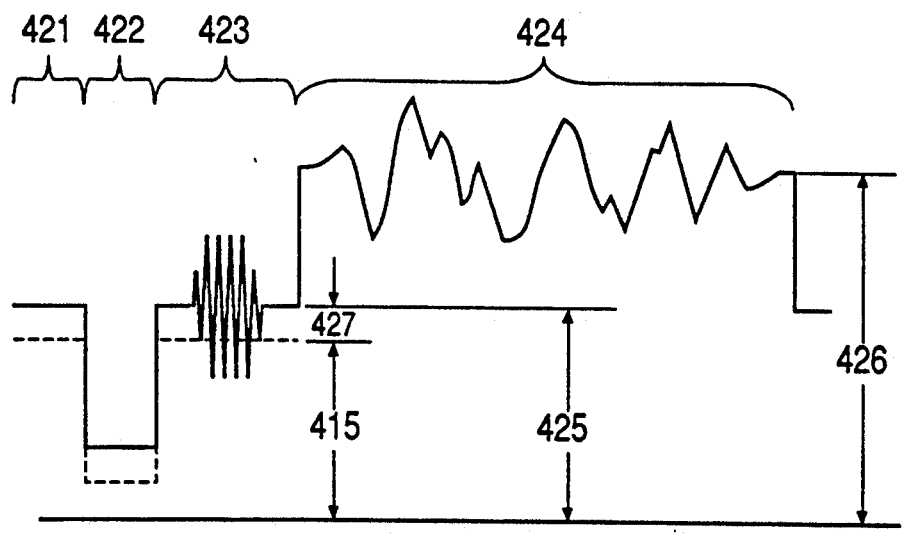
FIG. 4(b) is an example of waveform diagram of a scanning line for transmitting an additional information signal.
Figure 4C:
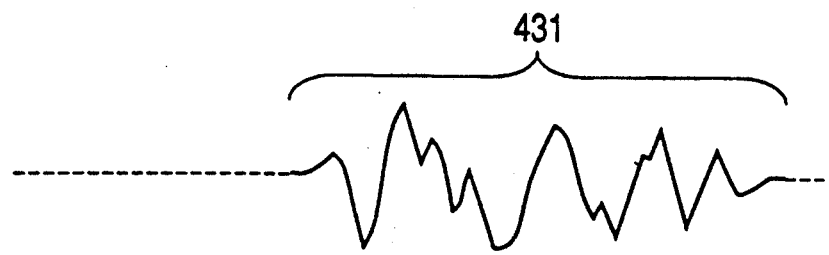
FIG. 4(c) is an example of waveform diagram of an additional information signal relating to the invention.

The adder 12 in FIG. 1 is an arithmetic unit which subtracts the offset reference value 416 held by the offset reference value hold circuit 9 from the additional information signal 424 provided with the offset value at the transmission side as shown in FIG. 4(b) out of the input base band video signal, adds the DC level reference value 415 held by the DC level reference value hold circuit 10, and subtracts the DC level 425 held by the DC level hold circuit 11, thereby produces the original additional information signal 431. This operation is equivalent to subtraction of the offset level 426 corrected of the effect of the fluctuation 427 of the DC level from the transmitted additional information signal 424, so that the original additional information signal 431 can be accurately reproduced as shown in FIG. 4(c) without leaving an unnecessary offset value.

A gate circuit may be provided between the first input of the additional information reproducing circuit 7 and the first input (+) of the adder 12 or at the output of the adder 12 for passing only the portion in which the additional information signal is inserted. Alternatively, a circuit for extracting the portion in which the additional information signal is inserted may be included in the video signal and additional information signal processing circuit 4.

The demodulated base band video signal may be either in the form of a digital signal or in the form of an analog signal.

What is claimed is:

1. A television signal processing apparatus for reproducing an additional information signal from an input television signal containing an additional information signal inserted in a specific scanning line after being provided with an offset at a transmission side and an offset reference value inserted in another specific scanning line, comprising:
    a level detector for detecting from the input television signal the offset reference value, a DC level of the scanning line containing the offset reference value, and a DC level of the scanning line containing the additional information signal;
    a first hold circuit for holding the offset reference value detected by the level detector until a next offset reference value is detected;
    a second hold circuit for holding the DC level of the scanning line containing the offset reference value detected by the level detector as a DC level reference value until a next DC level reference value is detected;
    a third hold circuit for holding the DC level of the scanning line containing the additional information signal detected by the level detector for one horizontal scanning period; and
    an arithmetic unit for subtracting the offset reference value held by the first hold circuit from the input television signal, adding the DC level reference value held by the second hold circuit, and subtracting the DC level held by the third hold circuit to obtain a reproduced additional information signal.

2. A television signal processing apparatus of claim 1, wherein the level detector detects a time average of each of the offset reference value, DC level reference value, and DC level.

3. A television signal processing apparatus of claim 1, wherein the level detector comprises accumulating means for accumulating its input signal for a specific period, and dividing means for dividing an output of the accumulating means by a value corresponding to the specific period.

4. A television signal processing apparatus for reproducing and delivering a video signal and an additional information signal from an input television signal containing an additional information signal inserted in a specific scanning line after being provided with an offset at a transmission side and an offset reference value inserted in another specific scanning line, comprising:
    a level detector for detecting from the input television signal an offset reference value, a DC level of the scanning line containing the offset reference value, and a DC level of the scanning line containing the additional information signal;
    a first hold circuit for holding the offset reference value detected by the level detector until a next offset reference value is detected;
    a second hold circuit for holding the DC level of the scanning line containing the offset reference value detected by the level detector as a DC level reference value until a next DC level reference value is detected;
    a third hold circuit for holding the DC level of the scanning line containing the additional information signal detected by the level detector for one horizontal scanning period;
    an arithmetic unit for subtracting the offset reference value held by the first hold circuit from the input television signal, adding the DC level reference value held by the second hold circuit, and subtracting the DC level held by the third hold circuit to obtain a reproduced additional information signal; and
    a video signal and additional information signal processing circuit for processing a video signal in the input television signal and the reproduced additional information signal.

5. A television signal processing apparatus of claim 4, wherein the level detector detects a time average of each of the offset reference value, DC level reference value, and DC level.

6. A television signal processing apparatus of claim 5, wherein the level detector comprises accumulating means for accumulating its input signal for a specific period, and dividing means for dividing an output of the accumulating means by a value corresponding to the specific period.

7. A television signal processing apparatus for reproducing and delivering a video signal and an additional information signal from a television signal containing an additional information signal inserted in a specific scanning line after being provided with an offset at a transmission side and an offset reference value inserted in another specific scanning line, comprising:

a tuner for selecting a television signal of a desired channel out of television signals received by an antenna;

a demodulator for demodulating the television signal selected by the tuner to convert it into a base band television signal;

a level detector for detecting from the base band television signal an offset reference value, a DC level of the scanning line containing the offset reference value, and a DC level of the scanning line containing the additional information signal;

a first hold circuit for holding the offset reference value detected by the level detector until a next offset reference value is detected;

a second hold circuit for holding the DC level of the scanning line containing the offset reference value detected by the level detector as a DC level reference value until a next DC level reference value is detected;

a third hold circuit for holding the DC level of the scanning line containing the additional information signal produced by the level detector for one horizontal scanning period;

an arithmetic unit for subtracting the offset reference value held by the first hold circuit from the base band television signal, adding the DC level reference value held by the second hold circuit, and subtracting the DC level held by the third hold circuit to obtain a reproduced additional information signal;

a video signal and additional information signal processing circuit for processing the base band television signal and the reproduced additional information signal; and a display unit for displaying an output signal of the video signal and additional information signal processing circuit.

8. A television signal processing apparatus of claim 7, wherein the level detector detects a time average of each of the offset reference value, DC level reference value, and DC level.

9. A television signal processing apparatus of claim 8, wherein the level detector comprises accumulating means for accumulating its input signal for a specific period, and dividing means for dividing an output of the accumulating means by a value corresponding to the specific period.

* * * * *